US009785909B2

(12) United States Patent
Hamilton, II et al.

(10) Patent No.: US 9,785,909 B2
(45) Date of Patent: Oct. 10, 2017

(54) PREVENTING PROPAGATION OF MALICIOUS CONTENT IN A VIRTUAL UNIVERSE

(75) Inventors: Rick A. Hamilton, II, Richmond, VA (US); Brian M. O'Connell, Research Triangle Park, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1148 days.

(21) Appl. No.: 12/548,462

(22) Filed: Aug. 27, 2009

(65) Prior Publication Data
US 2011/0054918 A1 Mar. 3, 2011

(51) Int. Cl.
G06Q 99/00 (2006.01)
G06Q 10/08 (2012.01)
G06F 21/56 (2013.01)
G06Q 50/00 (2012.01)

(52) U.S. Cl.
CPC .......... *G06Q 10/087* (2013.01); *G06F 21/56* (2013.01); *G06Q 50/01* (2013.01)

(58) Field of Classification Search
USPC .......... 705/1.1, 319; 715/706, 757; 707/952
See application file for complete search history.

(56) References Cited

U.S. PATENT DOCUMENTS

| | | | |
|---|---|---|---|
| 5,293,614 A | 3/1994 | Ferguson et al. | |
| 7,640,186 B1 | 12/2009 | Fraser et al. | |
| 7,913,305 B2 | 3/2011 | Bodorin et al. | |
| 7,984,304 B1 | 7/2011 | Waldspurger et al. | |
| 2003/0200464 A1* | 10/2003 | Kidron | 713/201 |
| 2003/0227392 A1 | 12/2003 | Ebert et al. | |
| 2005/0030309 A1 | 2/2005 | Gettman et al. | |
| 2007/0094731 A1* | 4/2007 | Teodosiu et al. | 726/24 |
| 2007/0174915 A1 | 7/2007 | Gribble et al. | |
| 2008/0004093 A1 | 1/2008 | Van Luchene et al. | |
| 2008/0141371 A1 | 6/2008 | Bradicich et al. | |

(Continued)

OTHER PUBLICATIONS

SubSane, Virtual Springfield Windows 95/98 and Macintosh Guide Version 1.0. Apr. 12, 2003 May 1, 2014 <http://www.gamesover.com/walkthroughs/virtual_springfield.txt>.*

(Continued)

*Primary Examiner* — Gabrielle McCormick
*Assistant Examiner* — Shaun Sensenig
(74) *Attorney, Agent, or Firm* — William H. Hartwell; Hunter E. Webb; Keohane & D'Alessandro PLLC

(57) ABSTRACT

An invention for preventing propagation of malicious content within a virtual universe is provided. In one embodiment, a malicious content propagation prevention tool provides this capability. The malicious content propagation prevention tool includes a scanning component configured to scan a plurality of inventory items within a virtual universe. An identification component is configured to identify a set of malicious inventory from the plurality of inventory items. The malicious content propagation prevention tool further comprises an assurance component configured to prevent propagation of malicious content within the virtual universe by performing at least one of the following: isolating the set of malicious inventory items, and modifying a malicious behavior caused by the set of malicious inventory items.

20 Claims, 7 Drawing Sheets

(56) References Cited

U.S. PATENT DOCUMENTS

| | | |
|---|---|---|
| 2008/0163379 A1 | 7/2008 | Robinson et al. |
| 2008/0207327 A1 | 8/2008 | Van Luchene et al. |
| 2009/0248696 A1* | 10/2009 | Rowles et al. .................. 707/10 |
| 2010/0031361 A1* | 2/2010 | Shukla ........................... 726/24 |

OTHER PUBLICATIONS

Yang, X., et al, "Hierarchical Animation Control of Avatars in 3-D Virtual Environments," IEEE Transactions on Instrumentation and Measurement, vol. 54, No. 3, Jun. 2005.
Arrison, S., "'Second Life' Lessons from a Virtual World," TechNewsWorld, Tech Buzz, Jul. 31, 2008, pp. 1-3.
Carter, W. et al, "Untangling the Web—Exploring Methods of Accessing Virtual Worlds," AFB Access World, Mar. 2008, vol. 9, No. 2, pp. 1-12.
Khoshnoodi, U.S. Appl. No. 12/198,145, Notice of Allowance & Fees Due, 11 pages.
Muttik, "The Name of the Game", 2007, McAfee Avert Labs, 19 pages.
U.S. Appl. No. 12/198,145, Office Action, Mar. 14, 2012, 15 pages.
U.S. Appl. No. 12/198,145, Office Action, Oct. 9, 2012, 32 pages.
U.S. Appl. No. 12/198,145, Office Action, Mar. 13, 2015, 16 pages.
Khoshnoodi, U.S. Appl. No. 14/987,109, Office Action, Aug. 9, 2017, 23 pgs.

* cited by examiner

US 9,785,909 B2

PREVENTING PROPAGATION OF MALICIOUS CONTENT IN A VIRTUAL UNIVERSE

CROSS-REFERENCE TO COPENDING APPLICATION

Commonly owned U.S. patent application, Ser. No. 12/198,145, entitled "System and Method for Triggering and Performing Scans to Protect Virtual Environments", filed on Aug. 26, 2008, contains subject matter related, in certain aspects, to the subject matter of the present application.

FIELD OF THE INVENTION

This invention relates generally to virtual universes and more specifically to preventing propagation of malicious content within a virtual universe caused by malicious activity.

BACKGROUND OF THE INVENTION

Virtual universes (VUs) or virtual worlds are computer-based simulated environments intended for its users or residents to inhabit and interact via avatars, which are personas or representations of the users of the virtual universes. These types of virtual universes are now most common in multiplayer online games, such as Second Life®, which is a trademark of Linden Research Inc. in the United States. Avatars in these types of virtual universes, which can number well over a million, have a wide range of business and social experiences.

Unfortunately, malicious activity caused by malicious inventory items within the virtual universe is potentially a pervasive problem. Malicious inventory items within the VU may disrupt economies, degrade services, and generally contribute to a less enjoyable user experience. Further, it is possible for well-meaning users to unwittingly propagate injurious inventory assets. For example, a user may purchase virtual items (e.g., design tools, VU-enabled mp3 players, or code enabling unique avatar actions) containing malicious scripts, which either drain valuable resources from the VU server or the user's client computer, or exploit vulnerabilities in either the server or client code.

SUMMARY OF THE INVENTION

In one embodiment, there is a method for preventing propagation of malicious content within a virtual universe comprising: scanning a plurality of inventory items within a virtual universe; identifying a set of malicious inventory items from the plurality of inventory items; and preventing propagation of malicious content within the virtual universe by performing at least one of the following: isolating the set of malicious inventory items, and modifying a malicious behavior caused by the set of malicious inventory items.

In a second embodiment, there is a computer system for preventing propagation of malicious content within a virtual universe. In this embodiment, the computer system comprises at least one processing unit and memory operably associated with the at least one processing unit. A malicious content propagation prevention tool is storable in memory and executable by the at least one processing unit. The malicious content propagation prevention tool comprises: a scanning component configured to scan a plurality of inventory items within a virtual universe; an identification component configured to identify a set of malicious inventory items from the plurality of inventory items; and an insulating component configured to prevent propagation of malicious content within the virtual universe by performing at least one of the following: isolating the set of malicious inventory items, and modifying a malicious behavior caused by the set of malicious inventory items.

In a third embodiment, there is a computer-readable medium storing computer instructions, which when executed, enables a computer system to prevent propagation of malicious content within a virtual universe. In this embodiment, the computer instructions comprise: scanning a plurality of inventory items within a virtual universe; identifying a set of malicious inventory items from the plurality of inventory items; and preventing propagation of malicious content within the virtual universe by performing at least one of the following: isolating the set of malicious inventory items, and modifying a malicious behavior caused by the set of malicious inventory items.

In a fourth embodiment, there is a method for deploying a malicious content propagation prevention tool for use in a computer system that prevents propagation of malicious content within a virtual universe. In this embodiment, a computer infrastructure is provided and is operable to: scan a plurality of inventory items within a virtual universe; identify a set of malicious inventory items from the plurality of inventory items; and prevent propagation of malicious content within the virtual universe by performing at least one of the following: isolating the set of malicious inventory items, and modifying a malicious behavior caused by the set of malicious inventory items.

Figure 1:
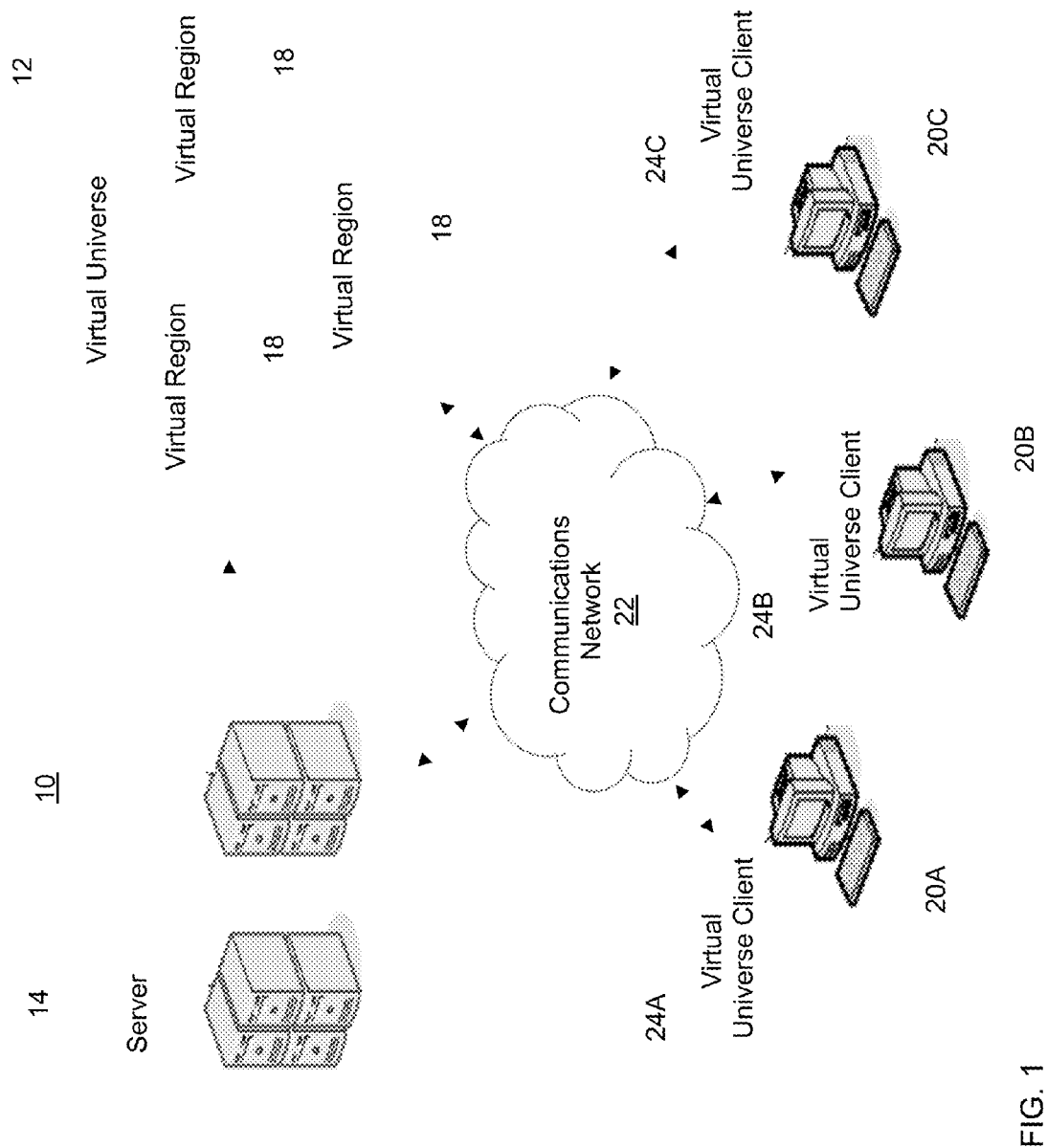
FIG. 1 shows a high-level schematic diagram showing a networking environment for providing a virtual universe according to one embodiment of this invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to preventing propagation of malicious content in a virtual universe by insulating malicious inventory items from the rest of the virtual universe. In these embodiments, a malicious content propagation prevention tool provides the capability to prevent propagation of malicious content in the virtual universe. Specifically, the malicious content propagation prevention tool comprises a scanning component configured to scan a plurality of inventory items within a virtual universe. An identification component is configured to identify a set (i.e., one or more) of malicious inventory based on a scan of the plurality of inventory items. The malicious content propagation prevention tool further comprises an assurance component configured to prevent propagation of malicious content within the virtual universe by performing at least one of the following: isolating the set of malicious inventory items, and modifying a malicious behavior caused by the set of malicious inventory items.

FIG. 1 shows a high-level schematic diagram showing a networking environment 10 for providing a virtual universe (VU) 12 according to one embodiment of this invention in which a service for preventing propagation of malicious content within a virtual universe can be utilized. As shown in FIG. 1, networking environment 10 comprises a server 14, which may be an array or grid of multiple servers each responsible for managing a portion of virtual real estate within VU 12. A virtual universe provided by a multiplayer online game, for example, can employ thousands of servers to manage all of the virtual real estate. The virtual content of VU 12 is comprised of a number of objects, each having associated texts/scripts, defined in a virtual universe programming code readable by VU 12. The virtual content is managed by server 14 and may show up in VU 12 as one or more virtual regions 18. Like the real-world, each virtual region 18 within VU 12 comprises a landscape having virtual content, such as buildings, stores, clubs, sporting arenas, parks, beaches, cities and towns all created by administrators or residents of the virtual universe that are represented by avatars. These examples of virtual content are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe, or even only one region in a small virtual universe. FIG. 1 also shows that users operating computers 20A-20C (hereinafter referred generally as 20) interact with VU 12 through a communications network 22 via virtual universe clients 24A-24C (hereinafter referred generally as 24) that reside in computers 20, respectively. Below are further details of VU 12, server 14, and virtual universe client 24.

One of the ways that users or administrators can interact with the virtual universe is to create virtual content for the virtual universe. An illustrative but non-limiting listing of virtual content that can be created includes inventory items such as apparel for avatars, animations for a multitude of purposes (e.g., advertisements, instructional material, etc.), avatar accessories (e.g., jewelry, hairpieces, clothing, etc.), scripts for performing certain functions in the virtual universes, building components, avatar appearance features, recreational equipment (e.g., bicycles), automobiles, etc. As will be further described herein, embodiments of this invention are directed to preventing propagation of malicious content within VU 12 in the case that one or more inventory items is found to be malicious (i.e., harmful, problematic, or likely to either drain valuable resources from VU server 14 or the user's client computer 24, or exploit vulnerabilities in either VU server code or client code).

Figure 2:
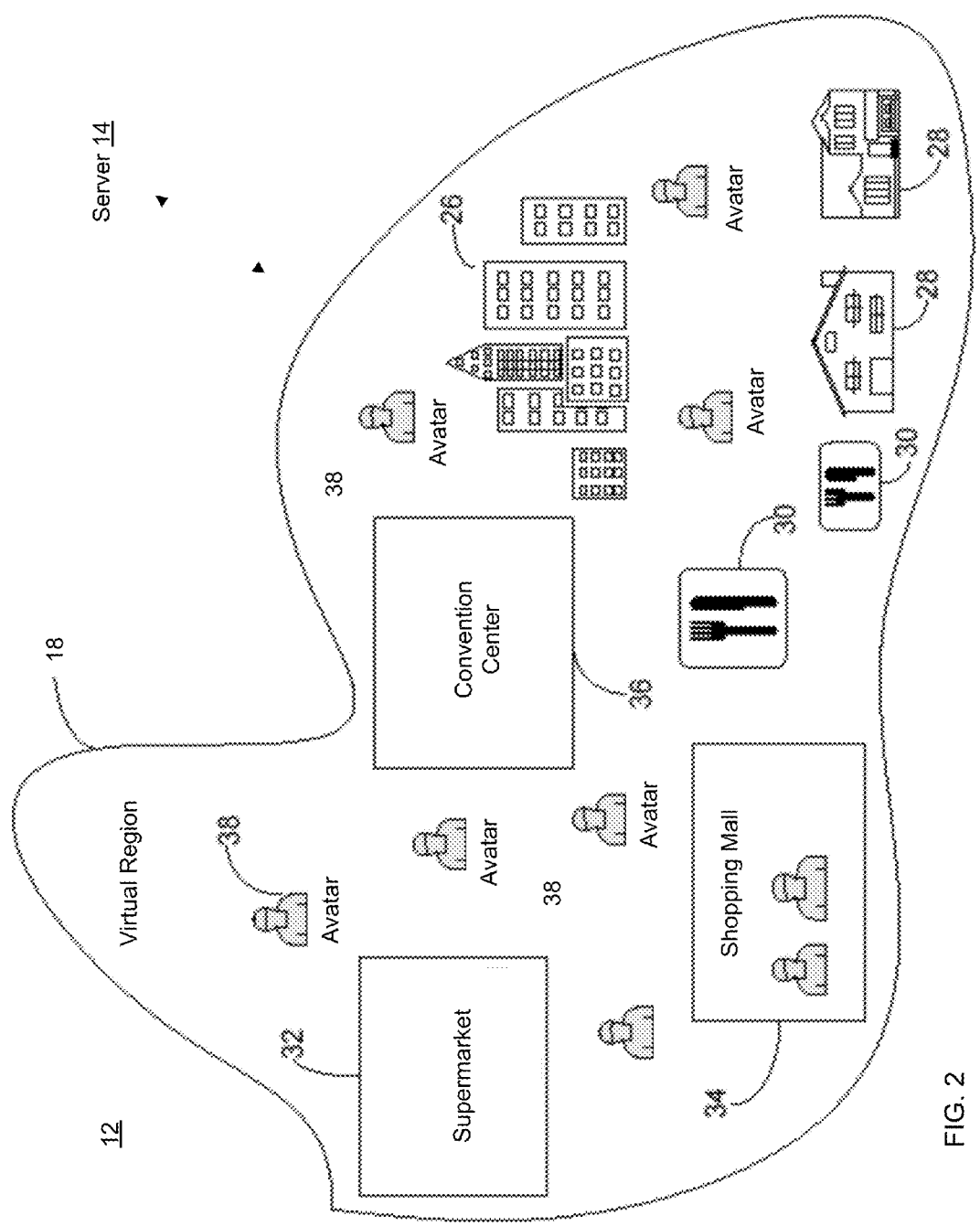
FIG. 2 shows a more detailed view of a virtual region shown in the virtual universe of FIG. 1.

FIG. 2 shows a more detailed view of what one virtual region 18 in VU 12 may comprise. As an example, virtual region 18 shown in FIG. 2 comprises a downtown office center 26, homes 28, restaurants 30, a supermarket 32 and a shopping mall 34 for shopping, and a convention center 36 for meetings and various conventions. Residents or avatars 38, which as mentioned above, are personas or representations of the users of the virtual universe, roam all about the virtual region by walking, driving, flying or even by teleportation or transportation, which is essentially moving through space from one point to another, more or less instantaneously. These examples of virtual content in virtual region 18 shown in FIG. 2 are only illustrative of some items that may be found in a virtual region and those skilled in the art will recognize that these regions can have more virtual content that can be found in the real world, as well as things that do not presently exist in the real world.

Figure 3:
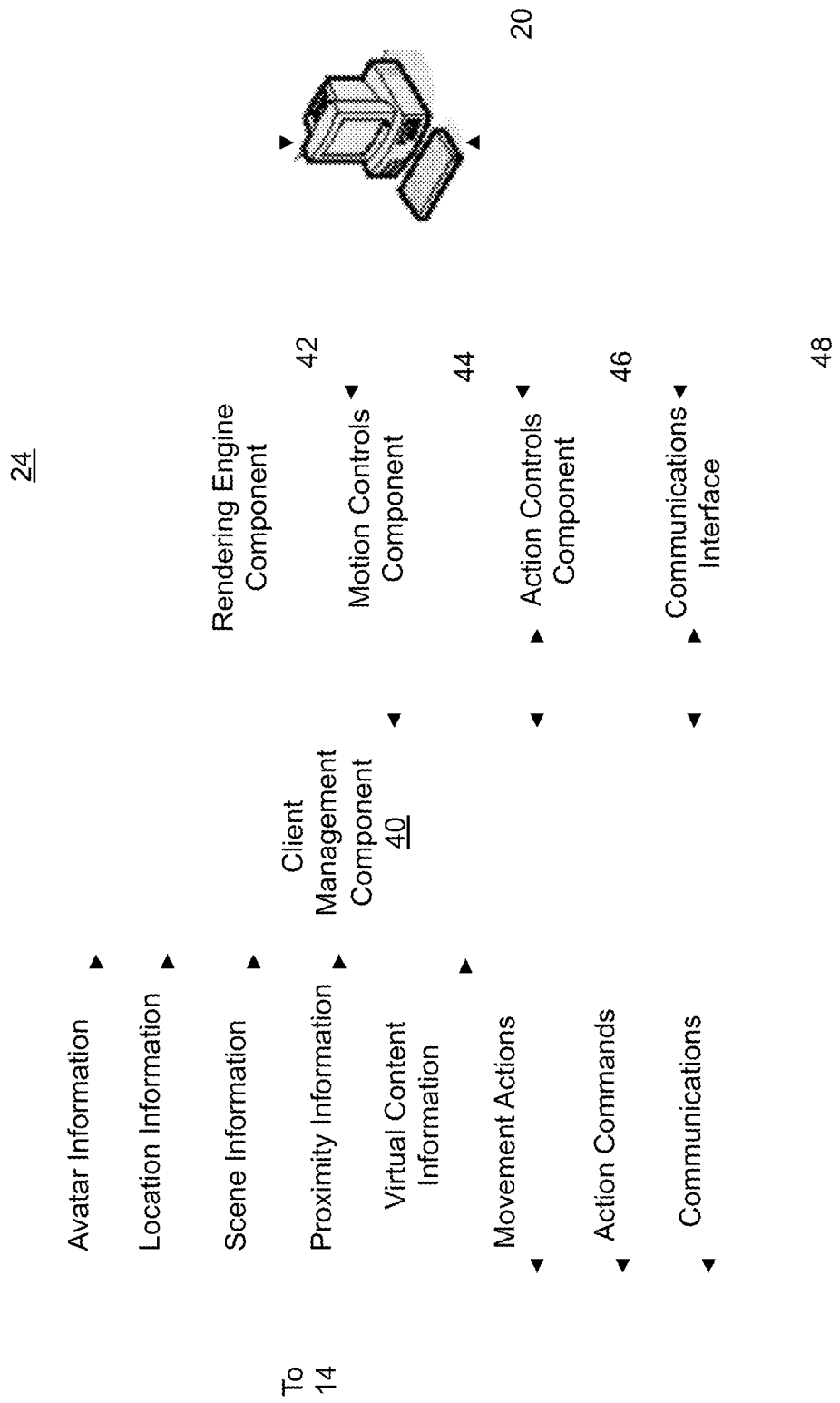
FIG. 3 shows a more detailed view of the virtual universe client shown in FIG. 1.

FIG. 3 shows a more detailed view of virtual universe client 24 shown in FIG. 1. Virtual universe client 24, which enables users to interact with VU 12, comprises a client management component 40, which manages actions, commands and communications made by a user through computer 20, and information received from the virtual universe through server 14. A rendering engine component 42 enables the user of computer 20 to visualize his or her avatar within the surroundings of the particular region of VU 12 that the avatar is presently located.

A motion controls component 44 enables the user's avatar(s) to make movements through the virtual universe. In one embodiment, movements through the virtual universe can include, for example, gestures, postures, walking, running, driving, flying, etc. An action controls component 46 enables the user to perform actions in the virtual universe such as buying items for his or her avatar or even for their real-life selves, building homes, planting gardens, etc. These actions are only illustrative of some possible actions that a user can perform in the virtual universe and are not limiting. A communications interface 48 enables a user to communicate with other users of VU 12 through modalities such as chatting, instant messaging, gesturing, talking and electronic mail (e-mail).

FIG. 3 shows the various types of information received by client management component 40 from the virtual universe through server 14. In particular, client management component 40 receives avatar information about the avatars that are in proximity to the user's avatar. In addition, client management component 40 receives location information about the area that the user's avatar is near (e.g., what region or land the avatar is in), as well as scene information (e.g., what the avatar sees). Client management component 40 also receives proximity information, which contains information on what the user's avatar is near, and virtual content information, which is information about the objects, texts, and scripts of the inventory items renderable in the virtual universe. FIG. 3 also shows the movement commands and action commands that are generated by the user and sent to the server via client management component 40, as well as the communications that can be sent to the users of other avatars within the virtual universe.

Figure 4:
FIG. 4 shows a more detailed view of some of the functionalities provided by the server shown in FIG. 1.

FIG. 4 shows a more detailed view of some of the functionalities provided by server 14 shown in FIG. 1. In particular, FIG. 4 shows a virtual region management component 50 that manages a virtual region(s) within the virtual universe. Virtual region management component 50 manages what happens in a particular region, such as the type of landscape in that region, the number of homes, commercial zones, boutiques, streets, parks, restaurants, etc. Those skilled in the art will recognize that virtual region management component 50 can manage many other facets within the virtual region.

FIG. 4 shows a network interface 54 that enables server 14 to interact with virtual universe client 24 residing on computer 20. In particular, network interface 54 communicates avatar, location, scene, proximity, and virtual content information to the user through virtual universe client 24. The network interface receives movement and action commands, as well as communications from the user via virtual universe client 24.

FIG. 4 also shows a malicious content propagation prevention tool 53, which provides the capability to prevent propagation of malicious content (e.g., malware, computer viruses) in virtual universe 12. In this embodiment, malicious content propagation prevention tool 53 resides on the same computer system as virtual universe client 24. However, it can be appreciated that in other embodiments, malicious content propagation prevention tool 53 may reside on server 14, or reside on separate computers in direct communication with the virtual universe server 14 and virtual universe clients 24.

As shown in FIG. 4, there are several different databases for storing information. In particular, virtual region database 52 stores information on all of the specifics in the virtual region that virtual region management component 50 is managing. Virtual region database 52 contains metadata information about the objects, texts and scripts associated with the virtual content in the virtual region(s) of VU 12. List of active avatars database 56 contains a list of all the avatars that are online in the VU 12, while user database 58 and information database 60 contain information on the actual human users of VU 12. In one embodiment, user database 58 contains general information on the users such as names, email addresses, locales, interests, ages, preferences, etc., while user information database 60 contains additional information on the users such as billing information (e.g., credit card information) for taking part in transactions. Asset database 62 contains information on the avatars of the users that reside in VU 12, as well as the inventory items within the personal inventories of each avatar of the virtual universe. An illustrative but non-limiting listing of the inventory items that can be present in asset database 62 includes avatar accessories (e.g., clothing), virtual pets, vehicles, electronic media (e.g., music files), graphics files, sound files, animations, electronic documents, video files, avatar body parts, avatar tools, calling cards, note cards, photos and photo albums, or any other type of virtual content.

Those skilled in the art will also recognize that databases 56-62 may contain additional information if desired. Databases 56-62 may be consolidated into a single database or table, divided into multiple databases or tables, or clustered into a database system spanning multiple physical and logical devices. Further, although the above information is shown in FIG. 4 as being stored in databases, those skilled in the art will recognize that other configurations and means of storing information can be utilized. For example, databases 56-62 might reside on the same computers as virtual universe client 24, have components that reside on both server 14 and virtual universe client 24, or reside on separate computers in direct communication with virtual universe server 14 and virtual universe client 24.

An avatar transport component 66 enables users to transport, which as mentioned above, allows avatars to transport through space from one point to another point, instantaneously. As a result, an avatar could for example travel from a business region to an entertainment region to experience a concert.

An avatar management component 68 keeps track of what the avatars are doing while in the virtual universe. For example, avatar management component 68 can track where each avatar is presently located in the virtual universe, as well as what activities it is performing or has recently performed. An illustrative but non-exhaustive list of activities can include shopping, eating, talking, recreating, etc.

Because a typical virtual universe has a vibrant economy, server 14 has functionalities that are configured to manage the economy. In particular, a universe economy management component 70 manages transactions that occur within the virtual universe between avatars. In one embodiment, VU 12 will have its own VU currency ($VU) that users pay for with real-life money. The users can then take part in commercial transactions for their avatars through universe economy management component 70. For example, a user might want to pay for a service that prevents propagation of malicious content in a virtual universe. In this case, the user (via his/her avatar) would make the purchase of this service using the $VU. In some instances, the user may want to take part in a commercial transaction that benefits him or her and not an avatar. In this case, a commercial transaction management component 72 allows the user to participate in the transaction. For example, while walking around a commercial zone, a user may see a pair of shoes that he or she would like for themselves and not an avatar. In order to fulfill this type of transaction and others similarly related, commercial transaction management component 72 interacts with banks 74, credit card companies 76 and vendors 78.

Figure 5:
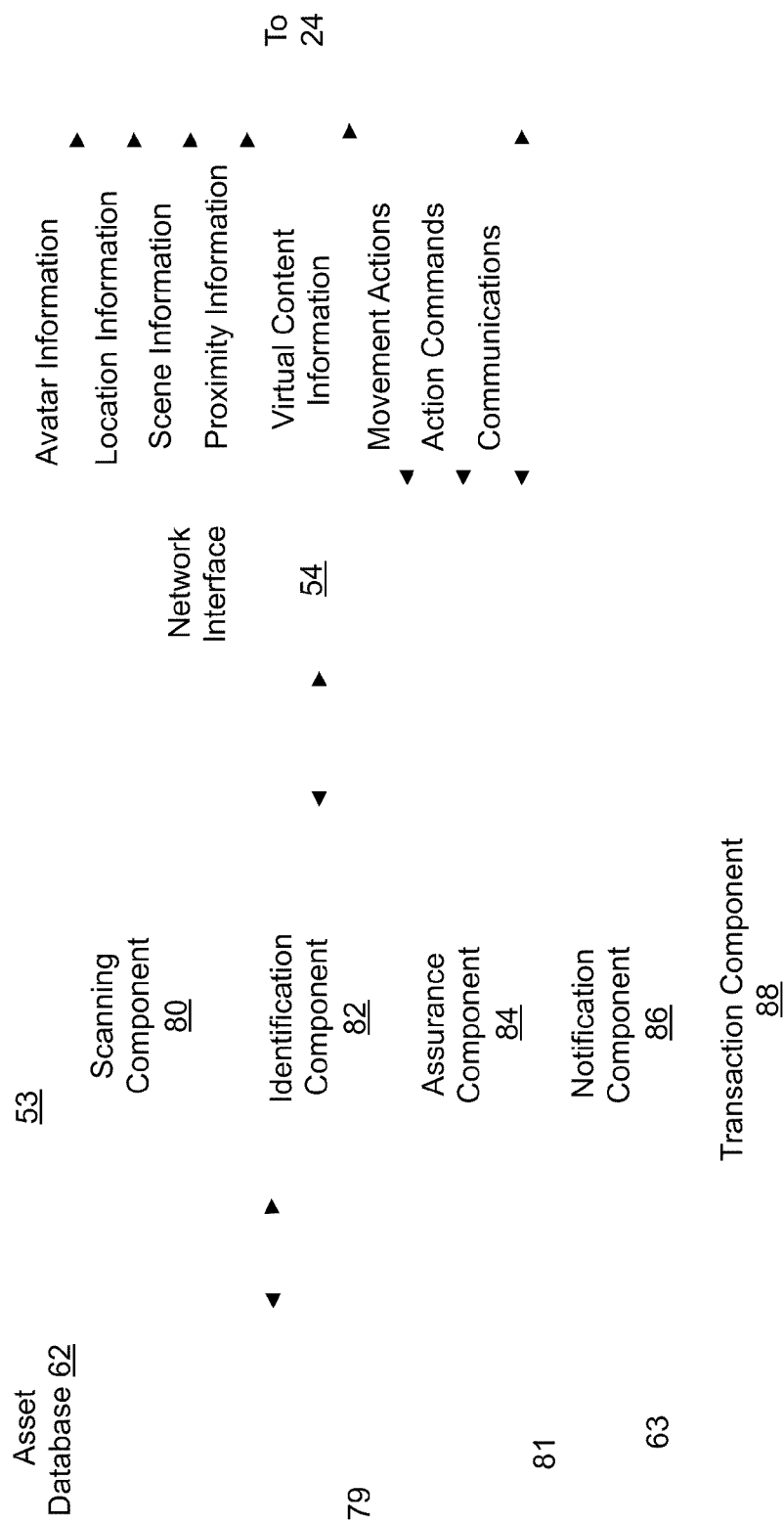
FIG. 5 shows a malicious content propagation prevention tool according to one embodiment of this invention that operates in the environment shown in FIG. 1.

Referring now to FIGS. 1 and 5, malicious content propagation prevention tool 53 according to embodiments of the invention will be described in further detail. As shown in FIG. 5, malicious content propagation prevention tool 53 comprises a scanning component 80 configured to scan plurality of inventory items 79 in virtual universe 12. This scanning may occur on a regular basis, or when an inventory item is received, placed into an inventory, or withdrawn from an inventory. Scanning component 80 allows a VU resident to analyze all of the inventory items in the avatar's inventory to check for malicious code. If desired, scanning component 80 may analyze only a portion of a user's inventory that is more likely to contain malicious code when executed (e.g., avatar gestures or items used while an avatar is flying). Additionally, scanning may be triggered by any number of events, including, but not limited to: entry to a region, when an item is picked up from a surrounding environment, when an item is placed in an inventory, when an item is accepted from an avatar offering the item, when an item is purchased, or during an avatar teleportation action.

Next, all the inventory items are analyzed to identify potentially malicious inventory items. To accomplish this, as shown in FIG. 5, malicious content propagation prevention tool 53 comprises an identification component 82 configured to identify a set of malicious inventory items 81 from plurality of inventory items 79 based on the scan. In one embodiment, each of set of malicious inventory items 81 is compared against a database (not shown) containing information regarding malicious inventory items, which may be maintained by VU 12 or a third party. The codes and scripts in the database may be used for comparison against the codes and scripts in set of malicious inventory items 81.

Furthermore, based on the results from the scan performed by scanning component 80, an indication of the threat level of the malicious content may be communicated to avatars/users or administrators of VU 12. Specifically, malicious content propagation prevention tool 53 comprises a notification component 86 configured to provide a notification in the case that set of malicious inventory items 81 is identified by identification component 82. In one embodiment, the notification comprises at least one of the following: a message provided in VU 12 (e.g., a pop-up message displayed to an avatar, a VU e-mail or chat message), a visual change in the color of set of malicious inventory items 81 (e.g., an inventory item may turn red if it is identified as malicious), a certification (i.e., letter or message) sent by postal mail, a telephone call, a text message, and a visual warning displayed on set of malicious inventory items 81 (e.g., a yellow caution sign that appears when an avatar approaches or interacts with a malicious item).

In the case that scanning component 80 identifies set of malicious inventory items 81, malicious content propagation prevention tool 53 takes steps to mitigate the threat of malicious content propagation to VU 12. To accomplish this, as shown in FIG. 5, malicious content propagation prevention tool 53 comprises an assurance component 84 configured to prevent propagation of malicious content within VU 12 by performance at least one of the following: isolating set of malicious inventory items 81, and modifying a malicious behavior caused by set of malicious inventory items 81. In one embodiment, if malicious content is identified, assurance component 84 is configured to send set of malicious inventory items 81 to a quarantined section 63 to prevent set of malicious inventory items 81 from being used, traded, or removed from an inventory (e.g., from an avatar's inventory). In this embodiment, quarantined section 63 is shown within asset database 62, which contains the inventory items within the personal inventories of each avatar 38 of virtual universe 12. However, it can be appreciated that quarantined section 63 may span multiple physical and logical devices. For example, quarantined section 63 might reside on the same computers as virtual universe client 24, have components that reside on both server 14 and virtual universe client 24, or reside on separate computers in direct communication with virtual universe server 14 and virtual universe client 24.

In another embodiment, malicious content propagation prevention tool 53 attempts to remedy malicious content (propagation) caused by set of malicious inventory items 81. Specifically, assurance component 84 is configured to perform at least one of the following: erase a portion of virtual language programming code that is causing the malicious behavior, and replace set of malicious inventory items 81. In this case, assurance component 84 erases a portion of the programming code and converts the inventory item to an item without the malicious behavior (i.e., a safe item). For example, a virtual dog may be identified as a malicious inventory item, and therefore rendered as having characteristics representing its maliciousness (e.g., large teeth and a menacing growl) to alert users of VU 12 to the presence of the malicious inventory item. In this embodiment, assurance component 84 erases a portion of the virtual programming code that is causing the malicious behavior and replaces it with virtual programming code that eliminates the malicious behavior. In this example, the virtual dog may be subsequently rendered with covered teeth and a happy expression to indicate to VU users that the malicious behavior has been corrected. However, in some cases, it may not be possible to replace only a portion of the virtual universe programming code if the malicious code is distributed throughout the item. In this case, insulating component 84 is configured to replace the malicious inventory items with "good" items, while deleting the malicious item(s).

In another embodiment of this invention, malicious content propagation prevention tool 53 is used as a service to charge fees for preventing propagation of malicious content within the virtual universe caused by malicious inventory items. As shown in FIG. 5, malicious content propagation prevention tool 53 comprises a transaction component 88 configured to charge a fee for performing at least one of the following: isolating set of malicious inventory items 81, modifying the malicious behavior cased by set of malicious inventory items 81, and providing the notification in the case that set of malicious inventory items 81 is identified. In this embodiment, the provider of the virtual universe or a third party service provider could offer this transaction as a service by performing the functionalities described herein on a subscription and/or fee basis. In this case, the provider of the virtual universe or the third party service provider can create, deploy, maintain, support, etc., malicious content propagation prevention tool 53 that performs the processes described in the invention. In return, the virtual universe or the third party service provider can receive payment from the virtual universe residents via universe economy management component 70 and commercial transaction management component 72 (FIG. 4).

In still another embodiment, the methodologies disclosed herein can be used within a computer system to prevent propagation of malicious content within the virtual universe. In this case, malicious content propagation prevention tool 53 can be provided, and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 6:
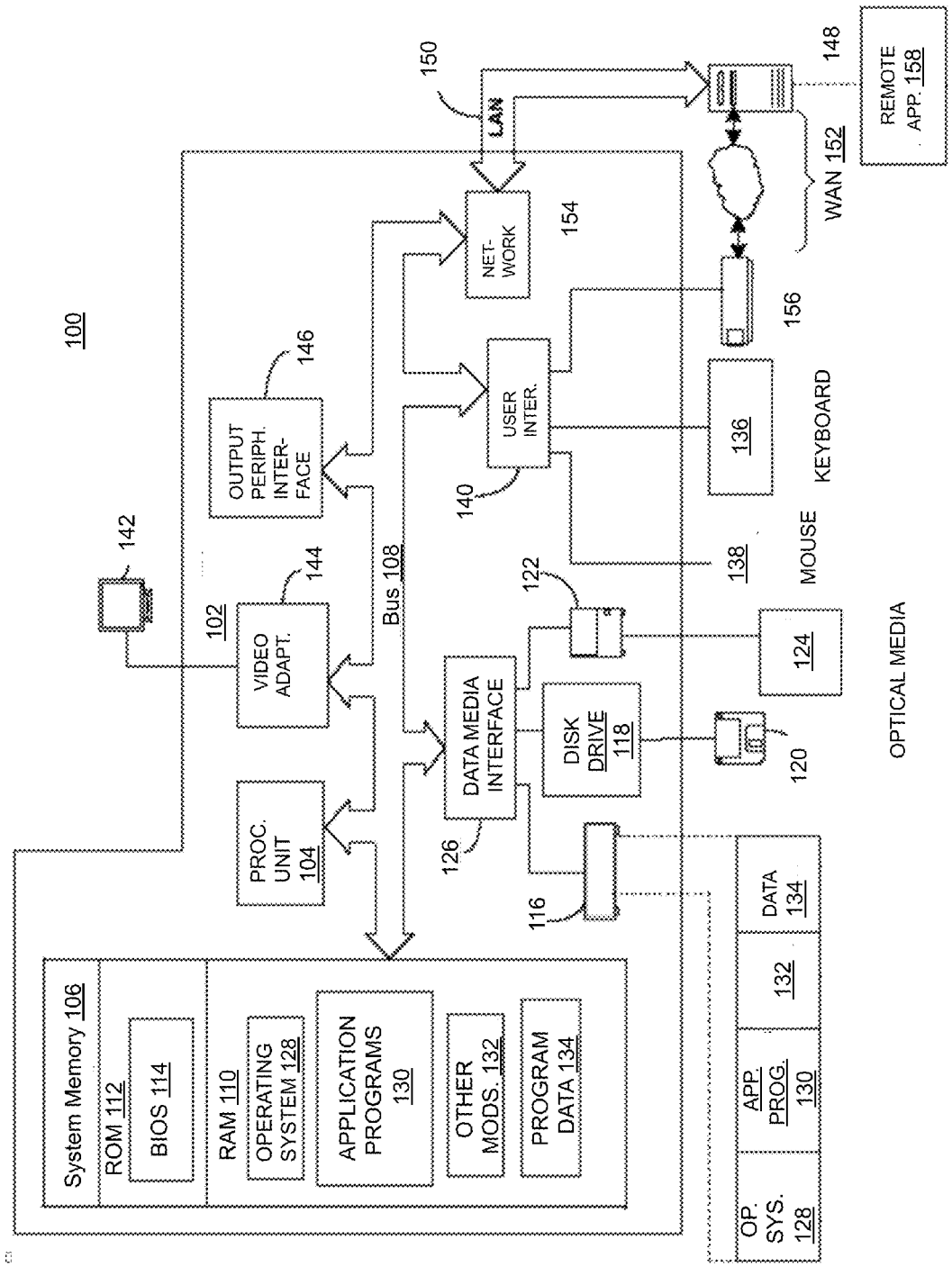
FIG. 6 shows a schematic of an exemplary computing environment in which elements of the networking environment shown in FIG. 1 may operate.

FIG. 6 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should computing environment 100 be interpreted as having any dependency or requirement relating to any one or combination of components illustrated in FIG. 6.

In the computing environment 100 there is a computer 102, which is operational with numerous other general purpose or special purpose computing system environments or configurations. Examples of well known computing systems, environments, and/or configurations that may be suitable for use with computer 102 of the present invention include, but are not limited to, personal computers, server computers, thin clients, thick clients, hand-held or laptop devices, cellular telephones, personal digital assistants (PDA), multiprocessor systems, microprocessor-based systems, set top boxes, programmable consumer electronics, network PCs, minicomputers, mainframe computers, distributed computing environments that include any of the above systems or devices, and the like.

Computer 102 may be described in the general context of computer-executable instructions, such as program modules, being executed by a computer. Generally, program modules include routines, programs, objects, components, logic, data structures, and so on that perform particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 6, computer 102 in the computing environment 100 is shown in the form of a general-purpose computing device. The components of computer 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 102 typically includes a variety of computer readable media. Such media may be any available media that is accessible by computer 102, and it includes both volatile and non-volatile media, removable and non-removable media.

In FIG. 6, system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 6 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. Hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130 other program modules 132, and program data 134 or some combination thereof, may include an implementation of the networking environment 10 of FIG. 1 including server 14 and virtual universe client 24. In one embodiment, the one or more application programs 130 include components of malicious content propagation prevention tool 53, such as scanning component 80, identification component 82, assurance component 84, notification component 86, and transaction component 88.

Figure 7:
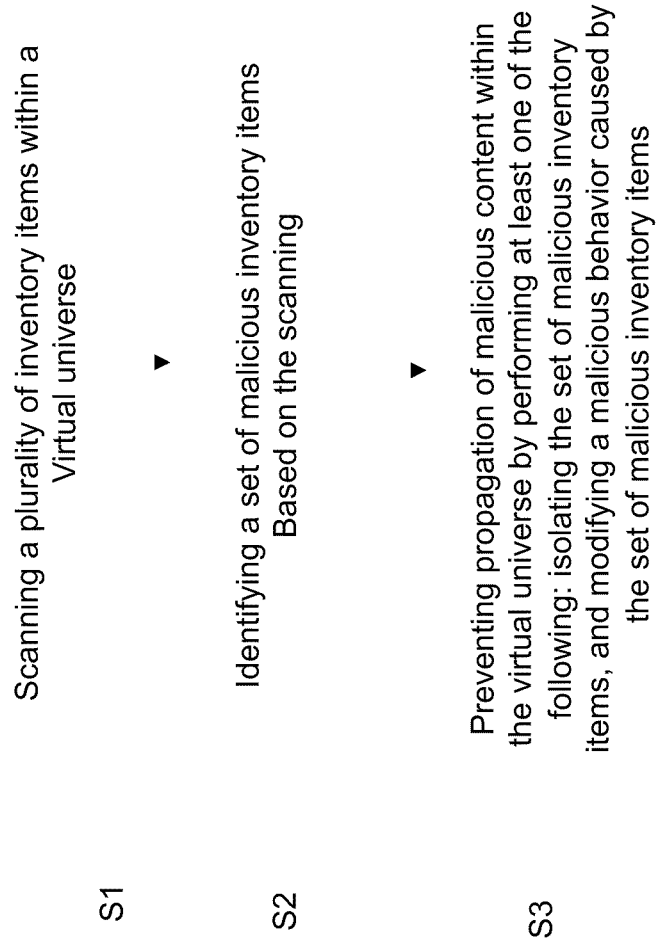
FIG. 7 shows a flow diagram of a method for preventing propagation of malicious content in a virtual universe according to embodiments of the invention.

The one or more program modules 130 carry out the methodologies disclosed herein, as shown in FIG. 7. According to one embodiment, in step S1, a plurality of inventory items within a virtual universe is scanned. In S2, a set of malicious inventory items is identified from the plurality of inventory items. In S3, malicious content (propagation) is prevented within the virtual universe by performing at least one of the following: isolating the set of malicious inventory items, and modifying a malicious behavior caused by the set of malicious inventory items. The flowchart of FIG. 7 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Referring back to FIG. 6, a user may enter commands and information into computer 102 through optional input devices such as a keyboard 136 and a pointing device 138 (e.g., a "mouse"). Other input devices (not shown) may include a microphone, joystick, game pad, satellite dish, serial port, scanner, camera, or the like. These and other input devices are connected to processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 6 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to system bus 108 via the user input interface 140 or other appropriate mechanism.

In a networked environment, program modules depicted relative to the personal computer 102, or portions thereof, may be stored in a remote memory storage device. By way of example, and not limitation, FIG. 6 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for preventing propagation of malicious content within a virtual universe to automatically reduce the load on the server functioning with the virtual universe. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for preventing propagation of malicious content within a virtual universe, comprising:
    a computing device determining whether an avatar has entered a new region in the virtual universe;
    the computing device scanning, in response to a determination that the avatar has entered the new region in the virtual universe, a plurality of inventory items within an inventory of an avatar within the virtual universe, the virtual universe being a server-based virtual environment in a client-server system in which a plurality of client users interact with each other and with the virtual environment via avatars associated with the client users, each inventory item of the plurality of inventory items being a virtual item that is associated with the avatar, visible within the virtual universe and usable by the avatar within the virtual universe,
    the computing device determining whether the avatar has received an item from another avatar;
    the computing device scanning, in response to a determination that the avatar has received an item from another avatar, the plurality of inventory items;
    the computing device determining whether the avatar has purchased an item;
    the computing device scanning, in response to a determination that the avatar has the avatar has purchased an item, the plurality of inventory items;
    the computing device determining whether the avatar has teleported;
    the computing device scanning, in response to a determination that the avatar has teleported, the plurality of inventory items;
    the computing device determining whether the avatar has used an item;
    the computing device scanning, in response to a determination that the avatar has used an item, the plurality of inventory items;
    the computing device determining whether the avatar has interacted with an item;
    the computing device scanning, in response to a determination that the avatar has interacted with an item, the plurality of inventory items;
    the computing device identifying a set of malicious inventory items from the plurality of inventory items;
    the computing device providing a visual notification rendered within the virtual universe identifying the set of malicious inventory items; and
    the computing device preventing propagation of malicious content within the virtual universe by replacing the set of malicious inventory items with a set of non-malicious inventory items within the inventory of the avatar.

2. The method according to claim 1, further comprising generating, along with the visual notification, at least one of the following: a certification sent by postal mail, a telephone call, and a text message, and wherein the visual notification comprises at least one of: a message provided in the virtual universe, a visual change in the color of the set of malicious inventory items, and a visual warning displayed on the set of malicious inventory items.

3. The method according to claim 2 further comprising the computing device charging a fee for performing at least one of the following: isolating the set of malicious inventory items, modifying a malicious behavior caused by the set of malicious inventory items, and providing a notification in the case that a set of malicious inventory items is identified.

4. The method according to claim 1, further comprising sending the set of malicious inventory items to a quarantined section to prevent the set of malicious inventory items from being at least one of the following: used, traded, and removed from the inventory.

5. The method according to claim 1, further comprising modifying the set of malicious inventor items by erasing a portion of virtual language programming code that is causing the malicious behavior.

6. A computer system for preventing propagation of malicious content within a virtual universe, comprising:
    at least one processing unit;
    memory operably associated with the at least one processing unit; and a malicious content propagation prevention tool storable in memory and executable by the at least one processing unit, the malicious content propagation prevention tool comprising:

an event handler configured to check for an occurrence of a set of events, including:
  an avatar entering a new region in the virtual universe;
  the avatar receiving an item from another avatar;
  the avatar purchasing an item;
  the avatar teleporting;
  the avatar using an item; and
  the avatar interacting with an item;
a scanning component configured to scan, in response to the occurrence of any of the set of events, a plurality of inventory items within an inventory of an avatar within a virtual universe, the virtual universe being a server-based virtual environment in a client-server system in which a plurality of client users interact with each other and with the virtual environment via avatars associated with the client users, each inventory item of the plurality of inventory items being a virtual item that is associated with the avatar, visible within the virtual universe and usable by the avatar within the virtual universe,
an identification component configured to identify a set of malicious inventory items from the plurality of inventory items;
a notification component configured to provide a visual notification rendered in the virtual universe in the case that a set of malicious inventory items is identified; and
an assurance component configured to prevent propagation of malicious content within the virtual universe by replacing the set of malicious inventory items with a set of non-malicious inventory items within the inventory of the avatar.

7. The malicious content propagation prevention tool according to claim 6, the notification component further configured to generate, along with the visual notification, at least one of the following: a certification sent by postal mail, a telephone call, and a text message, and wherein the visual notification comprises at least one of: a message provided in the virtual universe, a visual change in the color of the set of malicious inventory items, and a visual warning displayed on the set of malicious inventory items.

8. The malicious content propagation prevention tool according to claim 6 further comprising a transaction component configured to charge a fee for performing at least one of the following: isolating the set of malicious inventory items, modifying a malicious behavior caused by the set of malicious inventory items, and providing a notification in the case that a set of malicious inventory items is identified.

9. The malicious content propagation prevention tool according to claim 6, the assurance component configured to send the set of malicious inventory items to a quarantined section to prevent the set of malicious inventory items from being at least one of the following: used, traded, and removed from the inventory.

10. The malicious content propagation prevention tool according to claim 6, the assurance component further configured to modify the set of malicious inventor items by erasing a portion of virtual language programming code that is causing the malicious behavior.

11. A non-transitory computer-readable storage medium storing computer instructions, which when executed, enables a computer system to prevent propagation of malicious content within a virtual universe, the computer instructions comprising:

checking for an occurrence of a set of events, including:
  an avatar entering a new region in the virtual universe;
  the avatar receiving an item from another avatar;
  the avatar purchasing an item;
  the avatar teleporting;
  the avatar using an item; and
  the avatar interacting with an item;
scanning, in response to the occurrence of any of the set of events, a plurality of inventory items within an inventory of an avatar within a virtual universe, the virtual universe being a server-based virtual environment in a client-server system in which a plurality of client users interact with each other and with the virtual environment via avatars associated with the client users, each inventory item of the plurality of inventory items being a virtual item that is associated with the avatar, visible within the virtual universe and usable by the avatar within the virtual universe,
identifying a set of malicious inventory items from the plurality of inventory items;
providing a visual notification rendered within the virtual universe identifying the set of malicious inventory items; and
preventing propagation of malicious content within the virtual universe by replacing the set of malicious inventory items with a set of non-malicious inventory items within the inventory of the avatar.

12. The non-transitory computer-readable storage medium according to claim 11, further comprising generating, along with the visual notification, at least one of the following: a certification sent by postal mail, a telephone call, and a text message, and wherein the visual notification comprises at least one of: a message provided in the virtual universe, a visual change in the color of the set of malicious inventory items, and a visual warning displayed on the set of malicious inventory items.

13. The non-transitory computer readable storage medium according to claim 12 further comprising computer instructions for charging a fee for performing at least one of the following: isolating the set of malicious inventory items, modifying a malicious behavior caused by the set of malicious inventory items, and providing a notification in the case that a set of malicious inventory items is identified.

14. The non-transitory computer-readable storage medium according to claim 11, the computer instructions for preventing propagation of malicious content comprising sending the set of malicious inventory items to a quarantined section to prevent the set of malicious inventory items from being at least one of the following: used, traded, and removed from the inventory.

15. The non-transitory computer readable storage medium according to claim 11, the computer instructions for preventing further comprising modifying the set of malicious inventor items by erasing a portion of virtual language programming code that is causing the malicious behavior.

16. A method for deploying a malicious content propagation prevention tool for use in a computer system that prevents propagation of malicious content within a virtual universe, comprising:

providing a computer infrastructure operable to:
  check for an occurrence of a set of events, including:
    an avatar entering a new region in the virtual universe;
    the avatar receiving an item from another avatar;

the avatar purchasing an item;
the avatar teleporting;
the avatar using an item, and
the avatar interacting with an item;
scan, in response to the occurrence of any of the set of events, a plurality of inventory items within an inventory of an avatar within a virtual universe, the virtual universe being a server-based virtual environment in a client-server system in which a plurality of client users interact with each other and with the virtual environment via avatars associated with the client users, each inventory item of the plurality of inventory items being a virtual item that is associated with the avatar, visible within the virtual universe and usable by the avatar within the virtual universe,
identify a set of malicious inventory items from the plurality of inventory items;
provide a visual notification rendered within the virtual universe identifying the set of malicious inventory items; and
prevent propagation of malicious content within the virtual universe by replacing the set of malicious inventory items with a set of non-malicious inventory items within the inventory of the avatar.

17. The method according to claim 16, further comprising generating an additional notification identifying the set of malicious inventory items, the additional notification comprising at least one of the following: a certification sent by postal mail, a telephone call, and a text message, and wherein the visual notification comprises at least one of: a message provided in the virtual universe, a visual change in the color of the set of malicious inventory items, and a visual warning displayed on the set of malicious inventory items.

18. The method according to claim 16, the computer infrastructure further operable to charge a fee for performing at least one of the following: isolating the set of malicious inventory items, modifying a malicious behavior caused by the set of malicious inventory items, and providing a notification in the case that a set of malicious inventory items is identified.

19. The method according to claim 16, the computer infrastructure operable to prevent propagation of malicious content within the virtual universe by sending the set of malicious inventory items to a quarantined section to prevent the set of malicious inventory items from being at least one of the following: used, traded, and removed from the inventory.

20. The method according to claim 16, the computer infrastructure operable to prevent propagation of malicious content within the virtual universe further comprising modifying the set of malicious inventor items by erasing a portion of virtual language programming code that is causing the malicious behavior.

* * * * *